United States Patent
Arif et al.

(10) Patent No.: US 11,137,992 B2
(45) Date of Patent: Oct. 5, 2021

(54) FRAMEWORK FOR CHECKING THE COMPATIBILITY OF NEW SOFTWARE IMAGES

(71) Applicant: Arista Networks, Inc., Santa Clara, CA (US)

(72) Inventors: Mohammad Arif, Surrey (CA); Adam Calabrigo, San Jose, CA (US); Aaron Payment, Coquitlam (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/432,820

(22) Filed: Jun. 5, 2019

(65) Prior Publication Data
US 2020/0387365 A1    Dec. 10, 2020

(51) Int. Cl.
*G06F 8/61* (2018.01)
*G06F 8/71* (2018.01)
*G06F 9/445* (2018.01)

(52) U.S. Cl.
CPC .............. *G06F 8/63* (2013.01); *G06F 8/71* (2013.01); *G06F 9/44589* (2013.01)

(58) Field of Classification Search
CPC ........... G06F 8/63; G06F 9/44589; G06F 8/71
USPC ....................................................... 717/177
See application file for complete search history.

(56) References Cited

U.S. PATENT DOCUMENTS

| | | | | |
|---|---|---|---|---|
| 6,385,766 B1* | 5/2002 | Doran, Jr. | ........... | G06F 8/63 |
| | | | | 707/999.202 |
| 2003/0005426 A1* | 1/2003 | Scholtens | ........... | G06F 8/656 |
| | | | | 717/169 |
| 2006/0037016 A1* | 2/2006 | Saha | ........... | G06F 9/5061 |
| | | | | 717/178 |
| 2007/0240150 A1* | 10/2007 | Gangwar | ........... | G06F 8/61 |
| | | | | 717/174 |
| 2009/0119660 A1* | 5/2009 | Redpath | ........... | G06F 8/61 |
| | | | | 717/175 |
| 2009/0187822 A1* | 7/2009 | Abreu | ........... | G06F 8/61 |
| | | | | 715/700 |
| 2012/0084769 A1* | 4/2012 | Adi | ........... | G06F 8/63 |
| | | | | 717/174 |
| 2013/0262651 A1* | 10/2013 | Shah | ........... | G06F 8/658 |
| | | | | 709/224 |
| 2013/0283091 A1* | 10/2013 | Quin | ........... | G06F 8/63 |
| | | | | 714/3 |
| 2015/0301850 A1* | 10/2015 | Jeong | ........... | H04W 12/0602 |
| | | | | 718/1 |

(Continued)

*Primary Examiner* — Lewis A Bullock, Jr.
*Assistant Examiner* — Theodore E Hebert
(74) *Attorney, Agent, or Firm* — Fountainhead Law Group P.C.

(57) ABSTRACT

A framework for checking the compatibility of new software images to be installed on network devices is provided. In one set of embodiments, a network device running a first software image can receive, from a user, a command to install a second software image onto the network device in place of the first software image. Prior to installing the second software image, the network device can extract code for a compatibility check from a location within the second software image. The network device can then execute the code for the compatibility check and present a result value indicating a result of the compatibility check to the user.

19 Claims, 4 Drawing Sheets

(56) References Cited

U.S. PATENT DOCUMENTS

2017/0090897 A1\* 3/2017 Veereshwara ............. G06F 8/65
2019/0243628 A1\* 8/2019 Goldmann ............ G06F 16/188

\* cited by examiner

FRAMEWORK FOR CHECKING THE COMPATIBILITY OF NEW SOFTWARE IMAGES

BACKGROUND

Updating the software of a network device such as a switch or router generally involves issuing one or more commands to the network device that instruct the network device to (1) reboot itself and (2) load a new software image into its working memory, thereby replacing the network device's existing software image. Steps (1) and (2) are collectively referred to herein as "installing" the new software image onto the network device. Prior to carrying out (1) and (2), the network device will typically execute, via its existing software image, a number of checks to ensure that the new software image can be installed successfully. Among other things, these checks include compatibility checks that check whether the new software image is compatible with the network device's hardware and/or current software.

Conventionally, the foregoing compatibility checks are defined within, and loaded from, the network device's existing software image. One problem with this approach is that, in some update scenarios, a compatibility check may be needed that was not known at the time the existing software image was originally created (and thus does not exist within the existing software image). For example, consider a scenario where a user wishes to update a network device from an existing software image A (created in 2014) to a new software image B (created in 2018) but, due to a technical issue, B cannot be installed directly onto network devices running A. In this case, if the user attempts to carry out the update, the network device should ideally detect the incompatibility between B and A and stop the update from proceeding. However, because the compatibility checks used by the network device are pulled from its existing software image A and because A has no knowledge of the incompatibility (due to being created well before B), the network device cannot do so.

SUMMARY

A framework for checking the compatibility of new software images to be installed on network devices is provided. In one set of embodiments, a network device running a first software image can receive, from a user, a command to install a second software image onto the network device in place of the first software image. Prior to installing the second software image, the network device can extract code for a compatibility check from a location within the second software image. The network device can then execute the code for the compatibility check and present a result value indicating a result of the compatibility check to the user.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to a framework for checking the compatibility of a new software image that is presented for installation on a network device. Stated another way, this framework facilitates the definition and execution of compatibility checks that verify (based on, e.g., characteristics of the new software image and the network device's hardware and/or current software) whether the new software image can be successfully installed onto the network device. As used herein, a "software image" is a packaged set of executable code (e.g., programs, scripts, interfaces, libraries, etc.) and data that correspond to software employed by a device or system to carry out its designated functions. This software can include, e.g., an operating system kernel, device firmware, user-world services/applications, and so on.

At a high level, the framework of the present disclosure enables the compatibility checks described above to be defined within, and extracted from, the new software image itself, rather than the network device's existing software image. This advantageously allows the compatibility checks to incorporate criteria that may have been unknown at the time of creating the existing software image.

Additionally, in various embodiments the framework of the present disclosure specifies an extensible and standardized (e.g., plugin-based) compatibility check format. This format advantageously facilitates the creation of new compatibility checks by multiple different development teams/individuals and ensures that the created compatibility checks can be enforced properly across all upgrade scenarios that support the framework.

The foregoing and other aspects are described in further detail in the sections that follow.

2. Framework Components and High-Level Workflows

Figure 1:
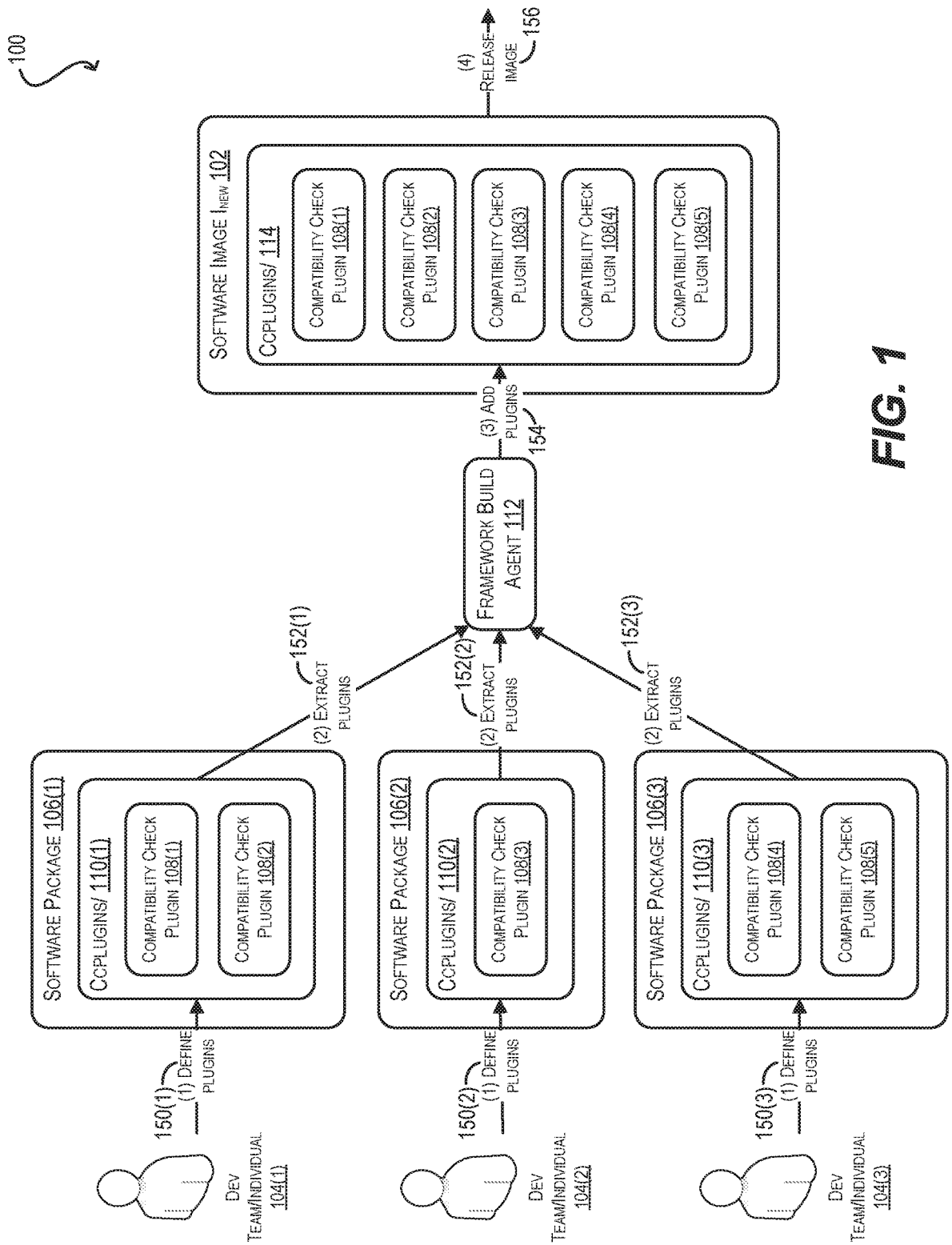
FIG. 1 depicts a high-level workflow for building a software image via the framework of the present disclosure according to certain embodiments.
Figure 2:
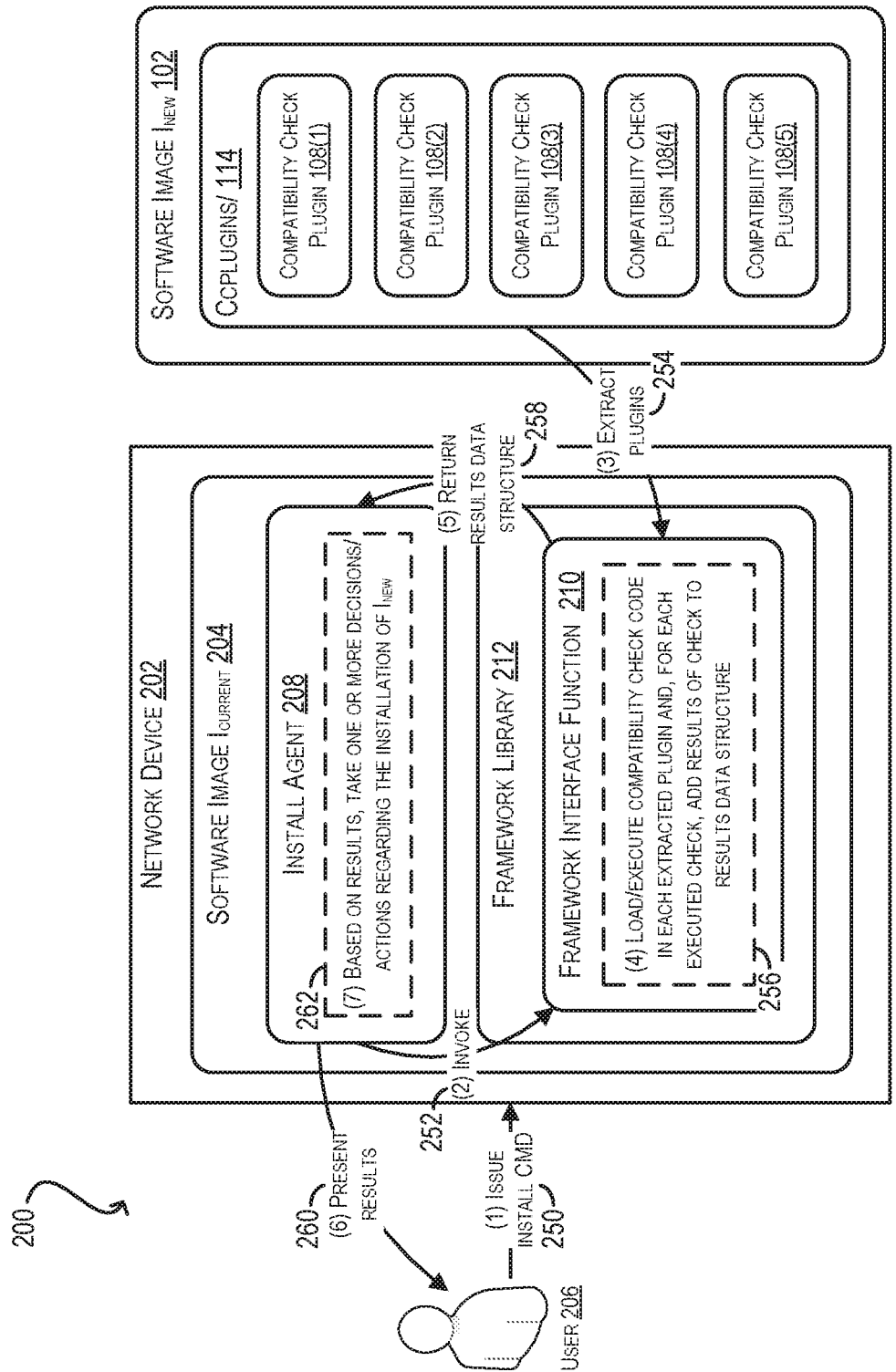
FIG. 2 depicts a high-level workflow for checking the compatibility of a new software image via the framework of the present disclosure according to certain embodiments.

FIGS. 1 and 2 are schematic diagrams 100 and 200 illustrating components of the framework of the present disclosure according to various embodiments, along with high-level workflows that may be executed by these components to realize certain goals of the framework. In particular, FIG. 1 depicts a workflow that may be executed at a time of developing and building a given software image $I_{new}$ (102) to incorporate compatibility checks for $I_{new}$—in other words, compatibility checks that check whether $I_{new}$ is compatible with the hardware/current software of a network device—within the image. FIG. 2 depicts a workflow that may be executed at the time a user attempts to install software image $I_{new}$ onto a network device (202) running an existing software image $I_{current}$ (204). With this workflow, network device 202 can extract the compatibility checks defined in software image $I_{new}$ and execute these compatibility checks to verify that $I_{new}$ can be successfully installed onto the network device, prior to carrying out the installation.

Starting with FIG. 1, at step (1) (reference numerals 150(1)-(3)), a number of different development teams or individuals developing different portions of software image $I_{new}$ (e.g., individuals/teams 104(1)-(3)) can define, in respective software packages 106(1)-(3), compatibility checks for $I_{new}$ that they would like to include in the final, released image. In this example, team/individual 104(1) has defined two compatibility checks, team/individual 104(2) has defined one compatibility check, and team/individual 104(3) has defined two compatibility checks. The code and metadata for each of these compatibility checks is structured as a compatibility check plugin 108 that has a consistent format understood by the framework. Certain details of this plugin format are discussed in section (3) below. In addition, each compatibility check plugin 108 is placed at a predetermined location 110 within its respective software package 106 (e.g., path "CCPlugins/"). In other embodiments, the location 110 may be identified through a search of the software package.

Once software packages 106(1)-(3) have been finalized and development of software image $I_{new}$ is complete, $I_{new}$ can be built by aggregating the contents of software packages 106(1)-(3) (as well as potentially other packages slated for inclusion into the image). As part of this build process, at steps (2) and (3) (reference numerals 152(1)-(3) and 154), a framework build agent 112 can extract compatibility check plugins 108(1)-(5) from their respective predetermined locations 110(1)-(3) in software packages 106(1)-(3) and add all of these plugins to a central location 114 within software image $I_{new}$ (e.g., path "CCPlugins/"). In this example, the relative path of location 114 in software image $I_{new}$ is the same as the relative path of location 110 in each software package 106, but this is not required.

Finally, at step (4) (reference numeral 156), software image $I_{new}$ comprising compatibility check plugins 108(1)-(5) can be released to users/customers.

Turning now to FIG. 2, at step (1) (reference numeral 250), a user 206 that has downloaded or otherwise obtained software image $I_{new}$ can issue a command (referred to herein as an "install" command) to network device 202 that identifies the storage location/path of $I_{new}$ and instructs network device 202 to install $I_{new}$, thereby replacing the device's existing software image $I_{current}$. In a particular embodiment this issued command can take the form "reload [new image path]," although other command formats are possible depending on, e.g., the command syntax supported by network device 202, the type of installation mechanism desired, etc.

Upon receiving the install command, an install agent 208 responsible for executing the command can, prior to proceeding with the installation process, invoke a framework interface function 210 which resides within a framework library 212 of existing software image $I_{current}$ (step (2), reference numeral 252). As part of this invocation, install agent 208 can pass to framework interface function 210 the storage location/path of $I_{new}$, as well as potentially other parameters received from user 206 and/or associated with command.

At step (3) (reference numeral 254), framework interface function 210 can locate software image $I_{new}$ per the storage location/path received from install agent 208 and extract compatibility check plugins 108(1)-(5) from location 114 within the image. Framework interface function 210 can then load and execute the compatibility check code encapsulated within each extracted plugin and, for each executed compatibility check, populate a results data structure with the results of the check (step (4), reference numeral 256). In various embodiments, these per-check results can include an indicator indicating the outcome or completion status of the compatibility check (e.g., incomplete, success, failure), as well as any non-blocking warnings or blocking errors that may have been generated. It should be noted that since each compatibility check plugin 108 adheres to the consistent plugin format mentioned earlier, framework interface function 210 (which understands this format) can carry out step (4) in a uniform and predictable manner with respect to each plugin.

Upon the completion of step (4), framework interface function 210 can provide the results data structure, which now contains the execution results for all compatibility checks extracted from software image $I_{new}$, to install agent 208 (step (5), reference numeral 258). Finally, install agent 208 can present these results to user 206 (step (6), reference numeral 260) and, based on an analysis of the result content, take one or more decisions/actions with regard to the installation of software image $I_{new}$ (step (7), reference numeral 262). For example, if all compatibility checks ran to completion and there are no check failures or blocking errors, install agent 208 can proceed with the installation. Conversely, if there is at least one check failure or blocking error, install agent 208 can abort the installation.

With the framework architecture and high-level workflows described above, a number of benefits are achieved over conventional approaches for performing compatibility checking during a software image update. First, because all of the compatibility checks pertaining to the new software image (i.e., the software image being installed) are defined within that new software image itself, the present framework provides significant flexibility in allowing or blocking the installation of the new software image based on compatibility criteria that the existing software image (i.e., the software image being replaced) may not know about.

Although it is possible to download new/updated compatibility checks to the existing software image on a periodic basis via, e.g., some online update mechanism, it is preferable to have the compatibility checks within the new software image itself because that guarantees the checks will be available at the time of installing the new software image. It is also possible for install agent 208 to automatically download compatibility checks that may apply to $I_{new}$ in an on-demand fashion immediately prior to installing the image. However, this approach is less efficient because it would result in such compatibility checks being downloaded for every install of $I_{new}$ onto a given network device. For example, if a customer is upgrading a fleet of one hundred network switches from $I_{current}$ to $I_{new}$, the compatibility checks would be downloaded one hundred times, rather that downloading $I_{new}$ once and applying that single image (with included compatibility checks) onto every device. In addition, this approach assumes the availability of a central repository of compatibility checks for all image releases as well as a network connection to the repository at the time of install, which opens the door for potential security breaches (either via compromising the repository or the network connection).

Second, because each compatibility check plugin conforms to a consistent format understood by the framework, it is relatively easy for different teams/individuals to add or remove compatibility checks as needed over different software image releases. Further, this consistent format makes it relatively easy to design the operation of the runtime components of the framework (e.g., framework interface function 210 and framework library 212) because the runtime components can rely on each compatibility check plugin being structured and operating in the same way.

The remaining sections of this disclosure describe additional details, features, and enhancements that may be implemented on top of the general framework design shown in FIGS. 1 and 2 in various embodiments, including the concept of plugin categories (section (3)), a specific plugin format (section (4)), and the concept of plugin exceptions (section (6)). It should be appreciated that FIGS. 1 and 2 are illustrative and not intended to limit the embodiments of the present disclosure. For example, although software image $I_{new}$ is depicted in these figures as solely including compatibility check plugins 108(1)-(5) and no other framework components, in practice software image $I_{new}$ will also include framework interface function 210 and framework library 212. The inclusion of components 210 and 212 in software image $I_{new}$ ensures that $I_{new}$ will be able to properly enforce framework compatibility checks that may be included in some other software image that is installed on top of $I_{new}$ at a future point in time.

Similarly, although software image $I_{current}$ is depicted in these figures as solely including framework interface function 210 and framework library 212 and no other framework components, in practice software image $I_{current}$ may also include one or more compatibility check plugins 108 that are relevant to $I_{current}$. These compatibility check plugins will be enforced if an attempt is made to install software image $I_{current}$ on any network device whose existing software image supports the framework.

3. Plugin Categories

It is possible that, in some cases, a compatibility check defined for a software image may be relevant (and thus should be executed) in one update/installation context, but may not be relevant (and thus should not be executed) in another update/installation context. For example, some network devices support a number of different installation mechanisms that offer different levels of availability during the installation event, with different technical limitations (e.g., a "regular" install with a cold reboot, an "accelerated" install with a warm reboot but with restrictions that do not apply to the regular install, and a "hitless" install with zero or near-zero downtime but with even more restrictions that do not apply to the regular and accelerated installs). In this example, a compatibility check C1 may be relevant if the accelerated install mechanism is used but may not be relevant or appropriate if the regular install mechanism is used. Similarly, a compatibility check C2 may be relevant if the hitless install mechanism is used but may not be relevant or appropriate if the regular or accelerated install mechanisms are used.

To account for this, in certain embodiments each compatibility check plugin created via the framework of the present disclosure can be associated with zero or more plugin categories that indicate the context(s) in which that plugin should be executed. For instance, returning to the example above with regular/accelerated/hitless install options, there may be a "regular" plugin category that is mapped to all compatibility check plugins to be executed during a regular install, an "accelerated" plugin category that is mapped to all compatibility check plugins to be executed during an accelerated install, and a "hitless" plugin category that is mapped to all compatibility check plugins to be executed during a hitless install.

Then, when a user initiates an accelerated install (via, e.g., a predefined accelerated install command), an indication of the "accelerated" plugin category can be passed to framework interface function 210 at the time of its invocation. In response, framework interface function 210 can proceed to extract and execute only those compatibility check plugins in the new software image that are associated with the "accelerated" plugin category. In this way, the framework can selectively enforce only those compatibility check plugins that are deemed to be relevant for a given installation context/scenario.

In the example above where the appropriate plugin context is tied to the type of install command issued by the user, the install agent executing the command can determine which plugin categories to pass to framework interface function 210. In other scenarios, this plugin category information can be passed into framework interface function 210 from other sources, such as from the user via one or more install command input parameters.

4. Example Plugin Format

The following is a list of features for a specific compatibility check plugin format that may be implemented by the framework of the present disclosure according to an embodiment. This list is provided as an example only and other plugin formats which incorporate a subset, superset, or none of these features may be employed in alternative embodiments.

1. Each compatibility check plugin may be implemented as a separate file within the predetermined software package location/path (i.e., location 110) described in section (2) above during the image development/build process.
2. Each compatibility check plugin may be compatible with a minimum language runtime version defined by the framework.
3. Each compatibility check plugin may identify one or more plugin categories that indicate the context(s) in which the plugin should be run.
4. Each compatibility check plugin may define a standard plugin interface function that includes the code of the compatibility check to be performed.
5. Each plugin interface function may return a result value indicating, at the least, whether the compatibility check succeeded, failed, or could not be completed.
6. Each plugin interface function may not rely on other plugins (e.g., the plugins should not need to be executed in a specific order).
7. Each compatibility check plugin may define a cleanup interface function that reverses any operations performed by its plugin interface function (if, e.g., the plugin interface function alters the current system configuration).

5. Framework Interface Function Operation

Figure 3:
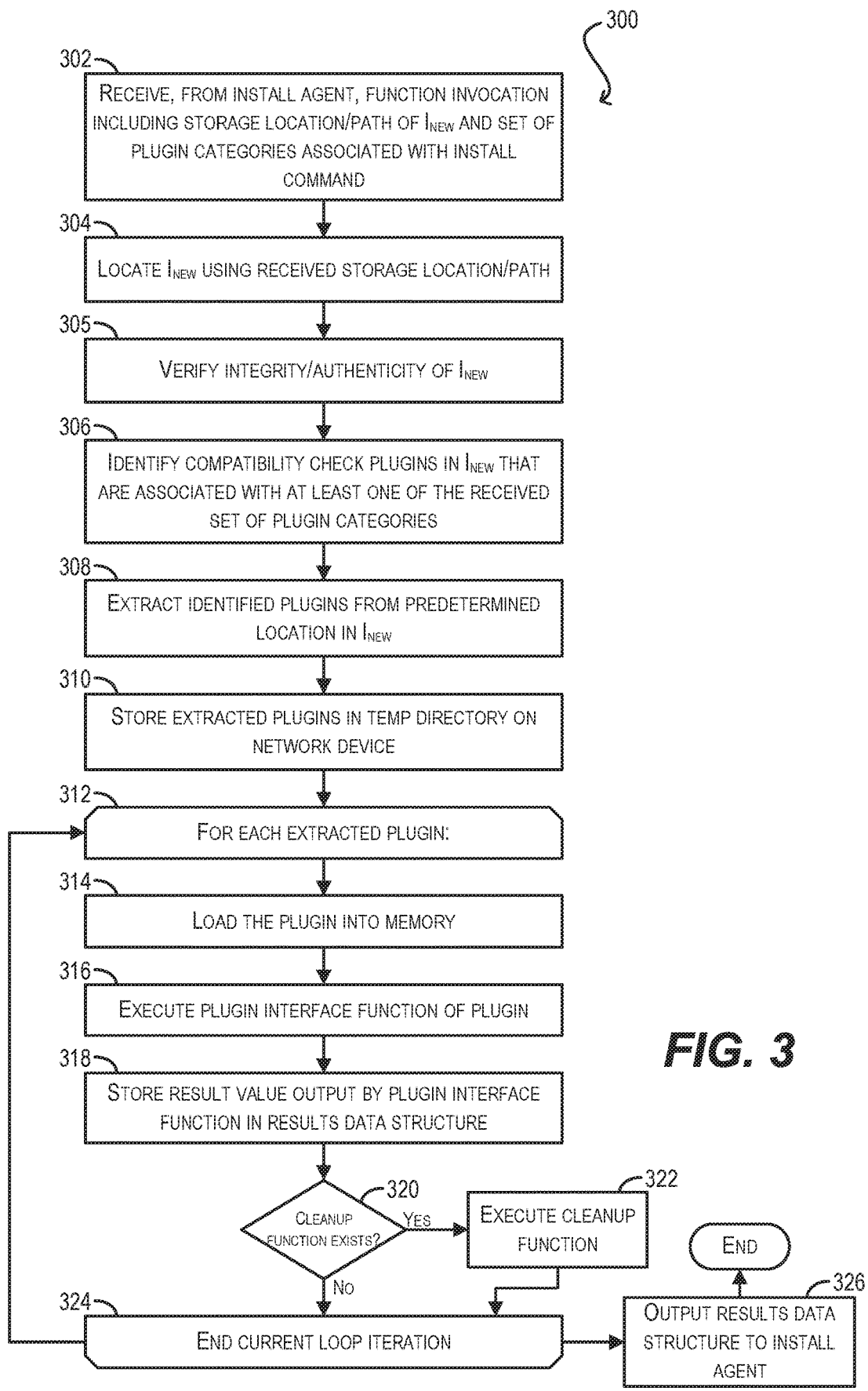
FIG. 3 is a flowchart that may be executed by a framework interface function of the framework of the present disclosure according to certain embodiments.

FIG. 3 is a flowchart 300 that provides additional details regarding the processing that may be performed by framework interface function 210 for extracting and executing the compatibility check plugins of software image $I_{new}$ at the time of installing $I_{new}$ onto network device 202 (per steps (3)-(5) of the workflow of FIG. 2) according to certain embodiments. Flowchart 300 assumes that each compatibility check plugin 108 of software image $I_{new}$ is structured according to the specific plugin format described in section (4) above. In addition, flowchart 300 assumes that the install command used to initiate the installation of $I_{new}$ is associated with a set of one or more plugin categories and this information is known to install agent 208.

Starting with block 302, framework interface function 210 can receive, from install agent 208, a function invocation that includes the storage location/path of software image $I_{new}$ and the set of plugin categories associated with the install command issued by user 206.

At block 304, framework interface function 210 can locate software image $I_{new}$ using the received storage location/path. Upon locating $I_{new}$, framework interface function 210 can verify the integrity/authenticity of this software image (block 305). In one set of embodiments, this verification step can involve verifying a digital signature included in the software image using any one of a number of digital signature schemes known in the art. Assuming that $I_{new}$ is authentic, framework interface function 210 can identify, from among all of the compatibility check plugins within the image, the particular plugins that are associated with at least one of the plugin categories received from install agent 208 (block 306). Framework interface function 210 can then extract the identified compatibility check plugins from location 114 within the image (block 308) and store the extracted plugins in a temporary directory on a storage component of network device 202 (block 310).

At block 312, framework interface function 210 can enter a loop for each extracted compatibility check plugin. Within this loop, framework interface function 210 can load the extracted compatibility check plugin into memory (block 314), execute the plugin interface function of the plugin (block 316), and store the result value output by the plugin interface function in a results data structure (block 318).

In addition, at block 320, framework interface function 210 can check whether the extracted compatibility check plugin defines a cleanup interface function. If so, framework interface function 210 can execute this function (block 322). If not (or upon completion of the cleanup interface function), framework interface function 210 can reach the end of the current loop iteration (block 324), return to block 312 in order to handle the next extracted compatibility check plugin, and repeat the loop until all extracted plugins have been processed.

Finally, upon exiting the loop, framework interface function 210 can output the results data structure to install agent 208 (block 326) and the flowchart can end.

6. Plugin Exceptions

Occasionally, framework interface function 210 may want to take a special action with respect to its execution of compatibility check plugins if the new software image being installed matches a particular version number (or some other identity string/number). Accordingly, in certain embodiments framework library 212 can include a plugin exceptions file which contains a data structure (e.g., data dictionary) mapping software image version numbers (or other identity strings/numbers) to predefined actions. In these embodiments, at the start of its processing, framework interface function 210 can check the version/identity string/number of the new software image against the data structure to determine whether that string/number matches a key string/number in the data structure. If so, framework interface function 210 can take the action specified in that data structure entry.

In one set of embodiments, the plugin exceptions file can support a "block" action which, if triggered, causes framework interface function 210 to add a blocking error to its results data structure and immediately end its processing (such that no compatibility check plugins are extracted or executed). This can be useful in scenarios where the network device vendor would like to unconditionally prevent the installation of a particular software image release (due to, e.g., a security vulnerability or other serious issue).

In another set of embodiments, the plugin exceptions file can support an "override" action which, if triggered, causes framework interface function 210 to load and run compatibility check plugins from the existing software image rather than from the new software image. This can be useful in scenarios where the network device vendor knows that the compatibility check plugins in the new software image include bugs that are not present or are addressed in the corresponding plugins of the existing software image. In some embodiments, the "override" action can include a list of compatibility check plugins that should be overridden, either on a name or plugin category basis.

The following is an example listing of the plugin exceptions file according to an embodiment:

Listing 1

```
pluginExceptions = {
    '4.16.?M'    :   'Block',
    '4.17.*'     :   'Block',
    '4.20.2'     :   'Override',
    '4.21.[12]F' :   'Override'
}
```

Note that in this example, the version number strings include UNIX-style wildcards as defined by the UNIX command fnmatch. In a particular embodiment, when checking whether the version number of the new software image matches a version number string in this file, framework interface function 210 can look for the "best" match, where "best" is decided according to the following rules:

1. If the version number string is an exact match to the new software image's version number, perform that entry's action.
2. Otherwise, perform the action of the longest version number string containing wildcards that match the new software image's version number.
3. If no version number string matches the new software image's version number, do not perform any action.

7. Show Command

In addition to being invoked by one or more install commands which are configured to install a new software image onto a network device, in some embodiments framework interface function 210 may also be invoked by a "show" command that is designed to simply output/present to a user the compatibility check results collected by the function. In these embodiments, the operation of framework interface function 210 remains fundamentally the same, however, upon receiving the results data structure from function 210, the process/agent responsible for executing the show command will simply display the results according to some format, without taking any other actions.

It should be appreciated that the command name "show" is provided as an example and any other command name (e.g., display, print, etc.) may be used to achieve this functionality.

8. Example Network Device

Figure 4:
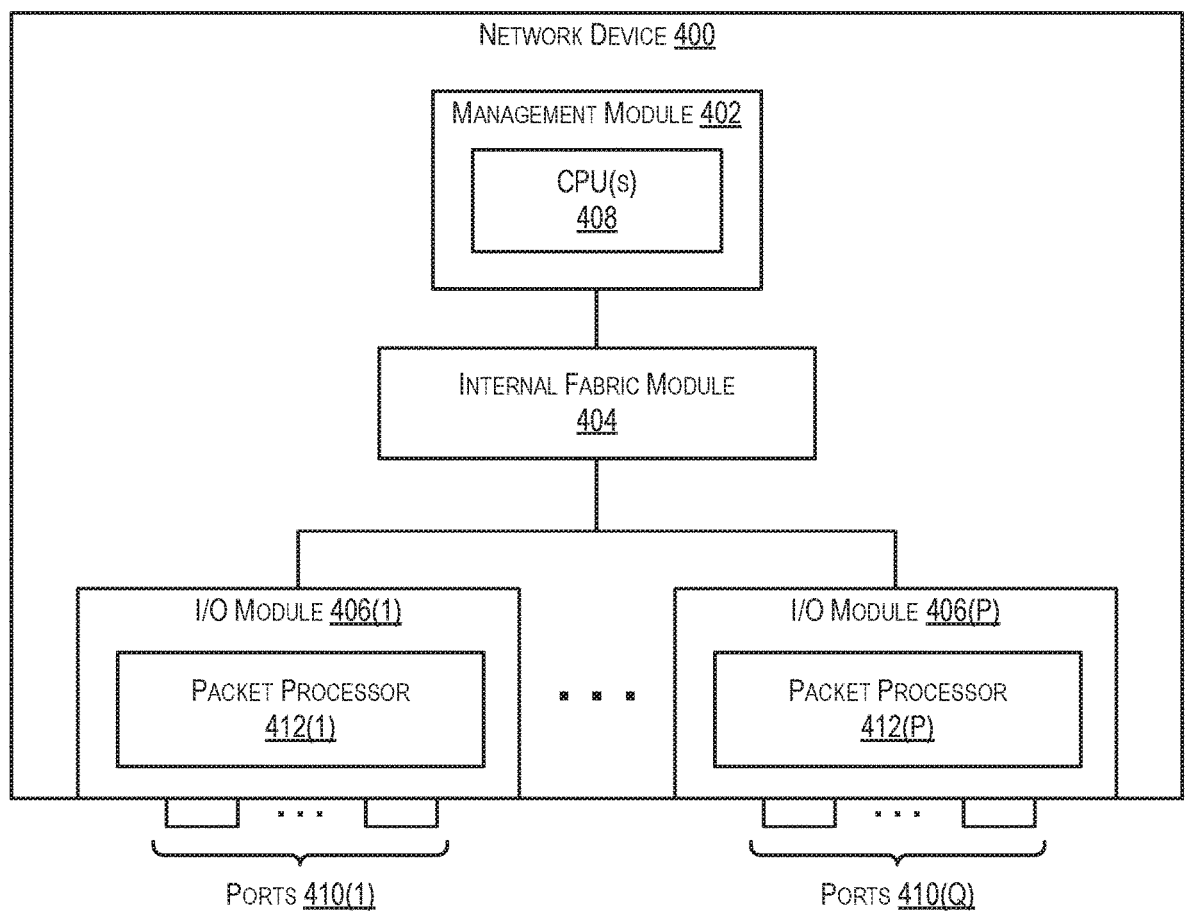
FIG. 4 depicts the architecture of an example network device according to certain embodiments.

FIG. 4 depicts the architecture of an example network device (e.g., a network switch or router) 400 according to an embodiment. Network device 400 may be used to implement any of the network devices described in the foregoing disclosure, such as network device 202 of FIG. 2.

As shown, network device 400 includes a management module 402, an internal fabric module 404, and a number of I/O modules 406(1)-(P). Management module 402 includes one or more management CPUs 408 for managing/controlling the operation of the device. Each management CPU 408 can be a general-purpose processor, such as an Intel/AMD x86 or ARM-based processor, that operates under the control of a software image installed onto the device and maintained in an associated memory (not shown).

Internal fabric module 1004 and I/O modules 406(1)-(P) collectively represent the data, or forwarding, plane of network device 400. Internal fabric module 404 is configured to interconnect the various other modules of network device 400. Each I/O module 406 includes one or more input/output ports 410(1)-(Q) that are used by network device 400 to send and receive network packets. Each I/O module 406 can also include a packet processor 412, which is a hardware processing component that can make wire speed decisions on how to handle incoming or outgoing network packets.

It should be appreciated that network device 400 is illustrative and many other configurations having more or fewer components than network device 400 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
receiving, by an agent on a network device running a first software image, a command from a user to install a second software image onto the network device in place of the first software image, wherein the agent invokes an interface function and the command specifies a category;
locating the second software image; and
prior to installing the second software image onto the network device:
selecting compatibility checks to be performed during an installation type associated with the category, wherein the compatibility checks are selected from a plurality of compatibility checks and the plurality of compatibility checks are within the second software image;
extracting, by the interface function, code for the selected compatibility checks from a predetermined location in the second software image, the compatibility checks comprising logic for determining whether the second software image can be successfully installed onto the network device based on one or more criteria;
for each compatibility check of the selected compatibility checks:
executing, by the interface function, the code for the compatibility check, the code for the compatibility check being structured according to a standardized format for the interface function; and
storing, by the network device, a result value indicating a result of the compatibility check; and
providing, by the network device, the stored result values to the user.

2. The method of claim 1 further comprising:
determining, based on the result value, whether to proceed with the installing of the second software image onto the network device.

3. The method of claim 1 wherein the one or more criteria include a characteristic of the second software image.

4. The method of claim 3 wherein the one or more criteria further include a characteristic of the first software image.

5. The method of claim 3 wherein the one or more criteria further include a characteristic of a hardware component of the network device.

6. The method of claim 1 wherein the result value includes a compatibility success indicator indicating that the compatibility check was successful, a compatibility failure indicator indicating that the compatibility check was unsuccessful, or an incomplete indicator indicating that the compatibility check could not be completed.

7. The method of claim 6 wherein the result value further includes a non-blocking warning or a blocking error generated by the executing.

8. The method of claim 1 wherein another compatibility check of the plurality of compatibility checks is not selected based on the category.

9. The method of claim 1 wherein the category indicates at least one of a regular upgrade process, an accelerated upgrade process, or a hitless upgrade process.

10. The method of claim 1 wherein the category is a first category-associated with a cold reboot of the network device, a second category associated with a warm reboot of the network device, or a third category associated with minimized downtime of the network device.

11. The method of claim 1 further comprising:
verifying the second software image using a digital signature.

12. The method of claim 1 further comprising:
storing, the extracted code for the selected compatibility checks in a temporary directory on the network device; and
loading the code for the compatibility check in a memory of the network device, wherein the command further specifies a storage location of the second software image.

13. A network device comprising:
a processor; and
a memory having stored thereon program code that, when executed by the processor, causes the processor to:
run a first software image;
while running the first software image, receive, by an agent on the network device, a command from a user to install a second software image onto the network device in place of the first software image, wherein the agent invokes an interface function and the command specifies a category;
locate the second software image; and
prior to installing the second software image onto the network device:

select compatibility checks to be performed during an installation type associated with the category, wherein the compatibility checks are selected from a plurality of compatibility checks and the plurality of compatibility checks are within the second software image;

extract, by the interface function, code for the selected compatibility checks from a predetermined location in the second software image, the compatibility checks comprising logic for determining whether the second software image can be successfully installed on the network device based on one or more criteria;

for each compatibility check of the selected compatibility checks:

execute, by the interface function, the code for the compatibility check, the code for the compatibility check being structured according to a standardized format for the interface function; and store a result value indicating a result of the compatibility check; and based on stored result values generated by the code for the selected compatibility checks, determine whether to proceed with installing of the second software image onto the network device.

14. The network device of claim 13 wherein the processor determines that the second software image should not be installed onto the network device if the result value includes a blocking error or a compatibility failure indicator.

15. A non-transitory computer readable storage medium have stored thereon program code for a first software image executable by a network device, the program code comprising:

code that causes an agent on the network device to receive a command from a user to install a second software image onto the network device, wherein the agent invokes an interface function and the command specifies a category;

code that causes the network device to locate the second software image;

code that causes the network device to, prior to installing the second software image onto the network device:

select compatibility checks to be performed during, an installation type associated with the category, wherein the compatibility checks are selected from a plurality of compatibility checks and the plurality of compatibility checks are within the second software image;

extract, by the interface function, code for the selected compatibility checks from a predetermined location in the second software image, the compatibility checks comprising logic for determining whether the second software image can be successfully installed onto the network device based on one or more criteria;

for each compatibility check of the selected compatibility checks:

execute, by the interface function, the code for the compatibility check; and store a result value indicating a result of the compatibility check, the code for the compatibility check being structured according to a standardized format for the interface function; and provide the stored result values to the user.

16. The non-transitory computer readable storage medium of claim 15 wherein the program code further comprises:

code that causes the network device to deter nine a version number of the second software image.

17. The non-transitory computer readable storage medium of claim 16 wherein the program code further comprises:

code that causes the network device to match the version number to an entry in a data dictionary; and code that causes the network device to perform an action defined in the matched entry.

18. The non-transitory computer readable storage medium of claim 17 wherein the action causes the network device to block or override all compatibility checks defined within the second software image.

19. The non-transitory computer readable storage medium of claim 15 wherein the one or more criteria include a criterion that was not defined in the first software image.

* * * * *